United States Patent

Surprenant et al.

[15] 3,663,293
[45] May 16, 1972

[54] VAPOR GENERATING APPARATUS FOR VAPOR DEGREASING PROCESS

[72] Inventors: Kenneth S. Surprenant, Midland; Raymond T. Gerard, Bay City, both of Mich.

[73] Assignee: The Dow Chemical Company, Midland, Mich.

[22] Filed: July 16, 1970

[21] Appl. No.: 56,237

Related U.S. Application Data

[63] Continuation of Ser. No. 741,520, July 1, 1968, abandoned.

[52] U.S. Cl. ................................................ 134/11, 134/31
[51] Int. Cl. ........................................................ B08b 5/00
[58] Field of Search ............................................. 134/11, 31

[56] References Cited

UNITED STATES PATENTS 1,905,968  4/1933  Robertson ........................... 134/11

*Primary Examiner*—Morris O. Wolk
*Assistant Examiner*—Joseph T. Zatarga
*Attorney*—Griswold & Burdick, C. E. Rehberg and Glwynn R. Baker

[57] ABSTRACT

A method and apparatus for continuously producing solvent vapors for degreasing metal parts and simultaneously purifying the solvent by directing liquid solvent which contains high boiling impurities onto a gravity flow heat exchange surface thereby to vaporize the low boiling solvent away from the high boiling impurities as the solvent flows across the heat exchange surface.

2 Claims, 5 Drawing Figures

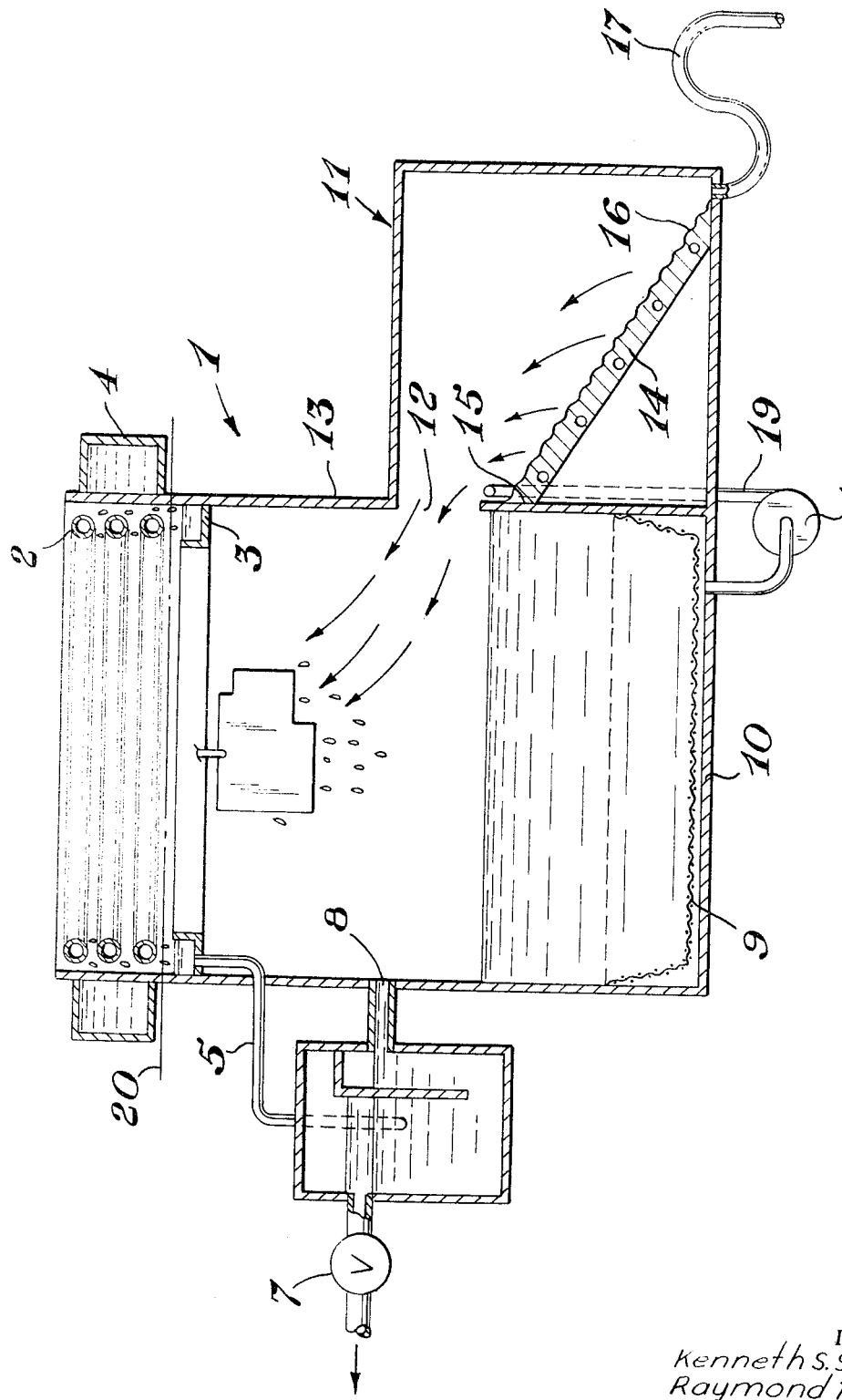

INVENTORS.
Kenneth S. Surprenant
Raymond T. Gerard
BY
ATTORNEY

VAPOR GENERATING APPARATUS FOR VAPOR DEGREASING PROCESS

This application is a continuation of application Ser. No. 741,520, filed July 1, 1968, now abandoned.

BACKGROUND OF INVENTION

The art of treating a material by causing the vapor of a solvent to condense on the material until the material's surface at least reaches the solvent vapor temperature is well documented in the literature. The numerous processes and apparatus set forth have not materially changed from those designed many years ago. For instance, the degreasing of the metal parts is accomplished by generating vapors of a solvent from a liquid sump, establishing a vapor level by providing condensing means at the desired level, introducing the soiled cold part into the vapors, thereby causing the vapor to condense on the part. The condensate containing the soil falls from the part into the sump. The part is taken from the vapor zone when its surface temperature reaches the solvent vapor temperature. The continued introduction of soil into the sump creates several problems. For example, the soil fouls the heat exchange surfaces creating sites whereat breakdown of the solvent can and does occur. This problem is partly remedied by periodic distillation of the solvent. Of course, this requires down-time on the degreaser. Further since the soil is sludge-like in character and sticks to the heat exchange surface, the interior of the degreaser must also be cleaned periodically. These operations are time consuming and uneconomical.

It is an object of the present invention to substantially eliminate these operations of cleaning the degreaser.

It is another object of the present invention to provide a process for simultaneously vaporizing solvent and purifying the solvent.

It is still another object of the present invention to provide apparatus suitable for accomplishing the process of the present invention.

These and other objects will become apparent to those skilled in the art from the following description and claims.

BRIEF DESCRIPTION OF THE INVENTION

The present invention comprises a method whereby a solvent of the class halogenated hydrocarbons having 1 to 3 carbon atoms and 2 to 6 halogen atoms is vaporized, the vapors are employed to treat a material by condensing on the material, the condensed solvent collected as it runs off the material and condensed solvent transported to the vaporization step whereby high boiling impurities are continuously removed from the process, said vaporization step being conducted by causing a falling film of solvent containing the high boiling impurities to pass over a heat exchange means capable of volatilizing the solvent but not the high boiling impurities.

The present invention also comprises one form of an apparatus for conducting the process of the present invention consisting of a receptacle for holding liquid and vapor, provided with vapor level control means, and a heat exchange surface disposed angularly within said receptacle to receive solvent containing high boiling impurities and to volatilize the solvent and cause the high boiling impurities to move by gravitational force downwardly upon the surface of said heat exchanger and be withdrawn from the unit.

The apparatus in accordance with the present invention are illustrated in the drawings:

FIG. 1 illustrates a sectional view of an apparatus having the volatilization and purification element integral with one end of the apparatus;

Figure 3:
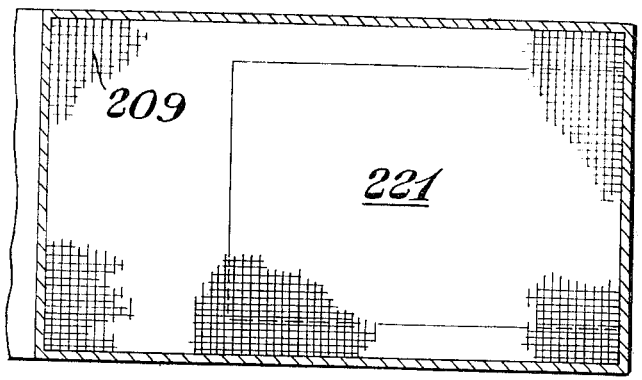
FIG. 3 illustrates a top view through section line 3—3 of FIG. 2 showing the configuration of the baffle to direct condensing fluids to the top end of the heat exchange surface and permit vapors to flow upward past the baffle.

In operation, an apparatus of the present invention, as illustrated in the drawings, is provided with a solvent capable of vaporization and which has a vapor density at least twice greater than air. The solvent is supplied either to the sump or storage. The vapor level control means is activated. A thin layer of solvent is delivered by a pump and piping to the heat exchange surface which is heated with steam, electricity, gas or other means. Solvent is vaporized from the surface of the heat exchanger and fills the heat exchange enclosure, its upper level being established and maintained by the vapor level control means. Solvent vapor in excess of that necessary to fill the receptacle is condensed by the vapor level control means and directed to a water separator whereupon when the solvent level therein reaches the solvent overflow, it is returned to the sump or storage to be recycled to the heat exchange surface. Once this cycle is established, the apparatus is ready to receive material which is to be treated. The cold material is introduced into the vapor zone wherein the solvent vapors condense on its surface, and for example, dissolve grease and oil and wash particulate soil from the surface. When the surface of the material has reached the temperature of the solvent vapors, no further condensation occurs and the material can be withdrawn from the vapor zone into the surrounding atmosphere. Alternatively, the material may be introduced through the vapor zone into a sump of solvent or flushed with a solvent spray for a greater wetting effect, then withdrawn into the vapor zone for further treatment and heating of its surface to the solvent vapor temperature.

It is an advantage of the process of the present invention that the solvent is continuously being purified of particulate matter such as soil, metal fines, etc., acids, oils and greases on each cycle of the solvent. It is a further advantage that heat economies are realized by employing the step of generating the requisite vapors required by the treatment simultaneous with the purification step. A further advantage of the present invention is that the inhibitors as well as other volatile components of the solvent can be vaporized along with the solvent thus maintaining their concentration in the vapor as well as in the liquid. These and other advantages which will be obvious to those skilled in the art are achieved by the employment of the apparatus described above.

DETAILED DESCRIPTION OF INVENTION

The following description is made with specific reference to the drawing:

One embodiment of the present invention comprises, as shown in FIG. 1, a generally rectangular box-shaped chamber 1 open at its top to the ambient atmosphere. Within said chamber near the open-top is located a series of tubes or pipe 2 which are designed to carry a cold fluid, such as water, and which serve as a vapor level control means. Directly below said tubes 2 positioned to collect condensate which forms on said tubes 2 is a collecting trough 3. Outside the box-like chamber 1 juxtapositioned with relation to said tubes 2 and said collecting trough 3, is a single-pass conduit 4 which is designed in a manner such that one of its walls is the wall of the chamber through which a cooling medium can flow. This conduit is hereinafter referred to as a cold wall 4. Associated with said collecting trough 3 and provided with tubing or piping 5 defining a fluid path from said collecting trough 3 thereto is a water trap 6. The trap is provided with a valve 7 to enable withdrawal of water from the trap 6. Also provided from said trap 6 is a solvent overflow pipe 8 for delivering condensed solvent to the interior of said chamber 1. A removable screen 9 is provided in and near the bottom 10 of the chamber 1.

Associated with, as an integral part of the chamber 1, is a smaller box,like structure 11. This second structure 11 is in fluid communication through an opening 12 in the side wall 13 of said chamber 1. Within said second structure 11 is a diagonally positioned heat exchange surface 14. The highest end 15 of which is near the opening 12 through the wall 13 of said chamber 1. Near the lower end 16 of said heat exchange surface 14 is provided a liquid trap 17 through which high boiling contaminates can be removed from the structure 11.

In the embodiment shown in FIG. 1 a pump 18 is provided to withdraw liquid from the bottom 10 of chamber 1 and deliver it through piping 19 to the upper end 15 of the heat exchange surface 14.

In operation of the degreaser described above, a liquid solvent such as trichloroethylene is loaded into said chamber 1 until the liquid is at a convenient level lower than the opening 12 in the chamber wall 13 communicating with the box-like structure 11. Cold water or similar fluid is fed to the tubing 2 and cold wall 4. Steam or other source of heat is introduced to said heat exchange surface 14 and the pump 18 activated. Solvent which is directed onto the heat exchange surface 14 is heated to its boiling temperature and vaporized. The so-vaporized solvent flows into the chamber 1 passing through the wall opening 12 and fills the chamber 1 with the hot vapors from the liquid bath to a level 20 at the vapor level control (condensing coils) 2. Solvent vapors are condensed on the coils 2, drop to the collecting trough 3 and flow into the water trap or separator 6. When the solvent in the water separator 6 reaches the overflow 8, solvent will return to the chamber 1 liquid bath. Once a vapor atmosphere is generated and fills the vapor zone 19, the apparatus is ready to receive material, for example, dirty, oily and greasy parts for cleaning. The cleaning is carried out in the well-known manner. The part being cold causes the solvent vapors to condense on its surfaces. The liquid solvent dissolves the grease and oil and washes away insoluble dirt. The part is, when its surface at least reaches the solvent vapor temperatures, at which time no more solvent vapor will condense thereon, removed from the vapor zone. However, the part may be actually dipped into the solvent bath below the vapor zone, then brought up into the vapor zone until its temperature reaches the vapor temperature, then withdrawn. In either case, the part is removed free of grease, oils and dirt and free of solvent.

Figure 2:
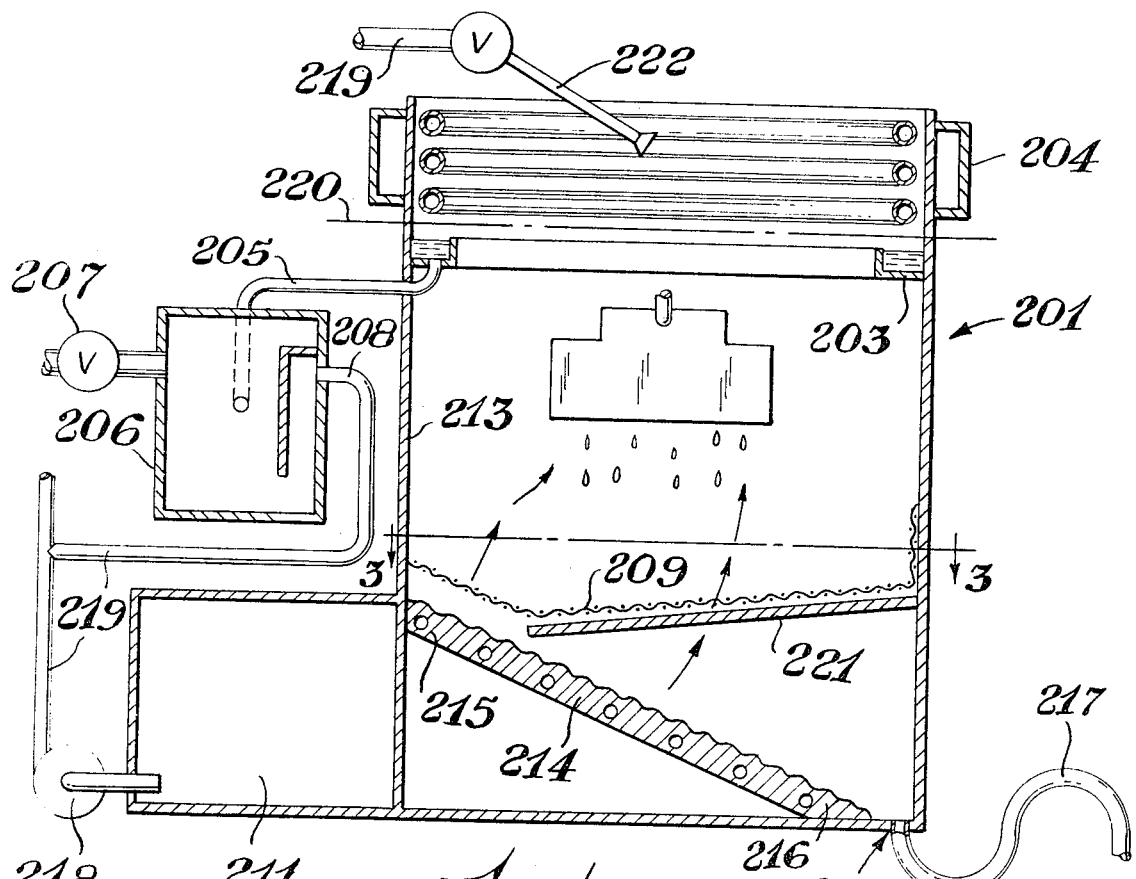
FIG. 2 illustrates sectional view of another form of an apparatus in which the heat exchange surface is within the receptacle proper but shielded from the falling condensate.

In another embodiment illustrated in FIGS. 2 and 3 a degreaser 201 similar to that shown in FIG. 1 is provided with the cooling coils 202, collecting trough 203, cold wall 204, water separator 206 and a heat exchange surface 202 located within the degreaser 201 proper. The heat exchange surface 214 is positioned in the bottom of the chamber 201 below the removable screen 209 and a baffle 221 covering the central portion of the heat exchange surface 214. The solvent storage 211 is exterior of the chamber 201 with a pup 218 delivering solvent to the heat exchange surface 214 through piping 219. Also illustrated with the particular embodiment is the common spray lance 222. This lance 222 can be supplied liquid solvent by the same pump 218 used to deliver solvent to the heat exchange surface 214. The water separator 206 returns the condensed solvent from the collecting trough 203 to the solvent storage 211. The operation of the embodiment shown in FIG. 2 is much the same as that first described in relation to operation of FIG. 1. The top view of the shield or baffle 221 is shown as FIG. 3 spaced from at least three walls to permit vapors to rise.

Figure 4:
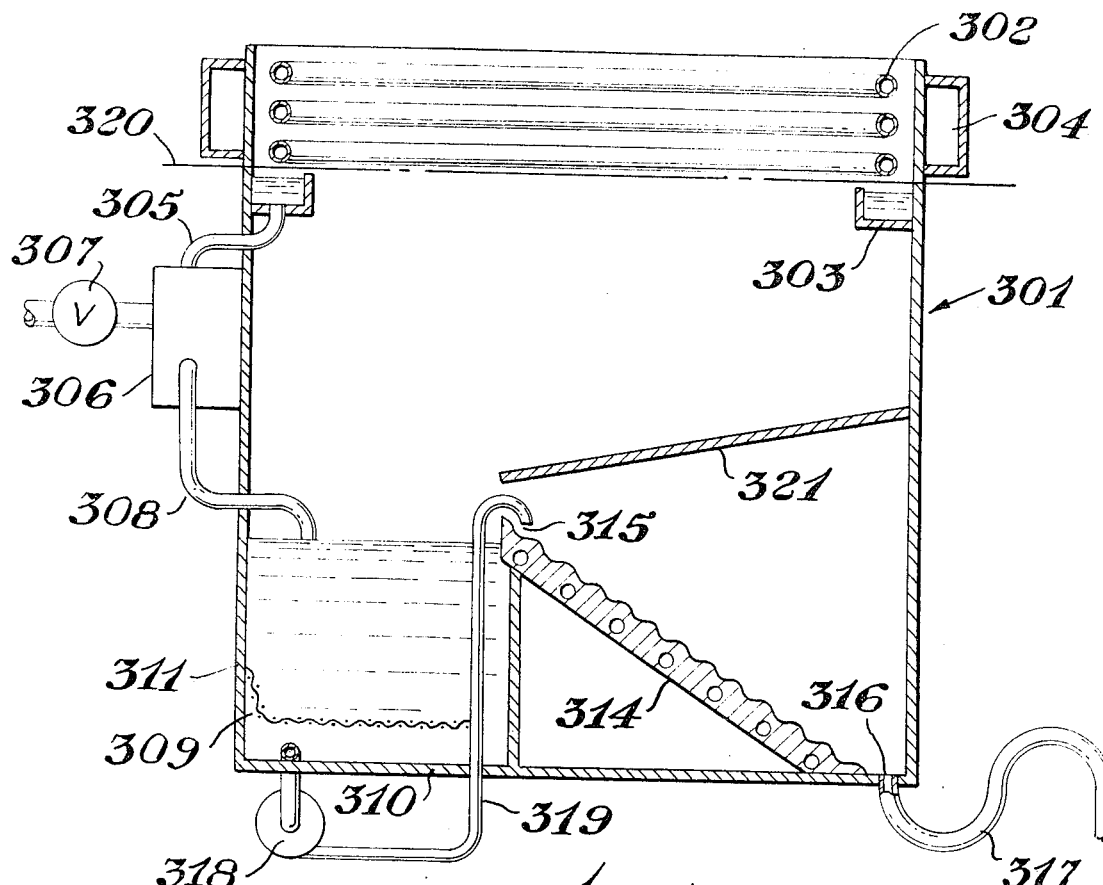
FIG. 4 illustrates a sectional view of another modification of an apparatus incorporating a warm dip section within the receptacle as well as the heat exchange surface.

A third embodiment of the present invention is illustrated in FIG. 4. The apparatus shown in FIG. 4 is a combination of the GENERAL designs of the apparatus shown in FIGS. 1 and 2. Reference numerals suffixed by the integer 3 refer to the same parts described with reference to FIG. 1.

Figure 5:
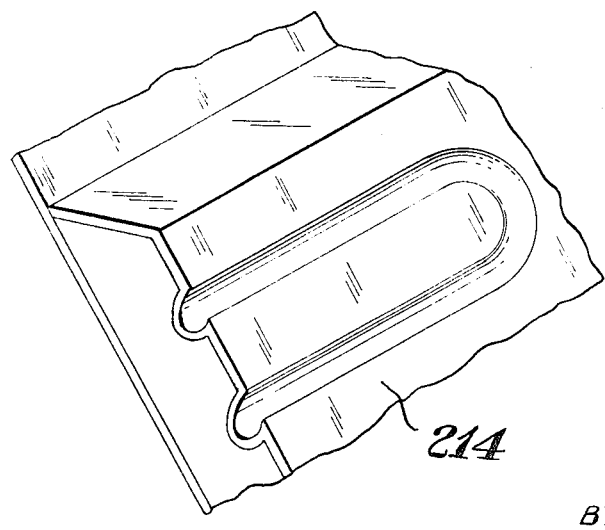
FIG. 5 illustrates a heat exchanger which can be used in place of the surface 14 in FIG. 1, 214 in FIG. 2 and 314 in FIG. 4.

FIG. 5 illustrates a design for the heat exchange surface 14, 214 or 314 of the apparatus shown in FIGS. 1, 2 and 4.

We claim:

1. A process for degreasing metal parts comprising continuously generating a vapor from a vaporizable solvent containing high boiling impurities in a vapor generating zone, said vapor rising into a main chamber, establishing an upper limit of said vapors in said main chamber, introducing cold metal parts to be treated into said vapors in said main chamber, maintaining said parts in said vapor until said parts reach the temperature of said vapors, collecting liquid which condenses on said parts and high boiling impurities dislocated from the surfaces of said parts and delivering said condensate and high boiling impurities to said vapor generating zone, said vapor generating step being conducted in said vapor generating zone by causing a falling film of said solvent containing high boiling impurities to flow by gravity down a diagonally positioned heat exchange surface, the highest end of said heat exchange surface being in open communication with said main chamber and the lowest end of said heat exchange surface being provided with a liquid trap through which high boiling impurities are continuously removed, the diagonally positioned heat exchange surface being capable of volatilizing the solvent but not the high boiling impurities so that the low boiling solvent is vaporized away from the high boiling impurities as the solvent containing high boiling impurities flows down said heat exchange surface, whereby the solvent vapor for degreasing the metal parts is generated simultaneously with a high boiling impurities separation and removal step.

2. A process as in claim 1, wherein said heat exchange surface is a roughened surface provided with small pockets disposed transversely thereof.

* * * * *